US008645288B2

(12) United States Patent
Wang et al.

(10) Patent No.: US 8,645,288 B2
(45) Date of Patent: Feb. 4, 2014

(54) PAGE SELECTION FOR INDEXING

(75) Inventors: Taifeng Wang, Beijing (CN); Bin Gao, Beijing (CN); Tie-Yan Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 12/959,060

(22) Filed: Dec. 2, 2010

(65) Prior Publication Data

US 2012/0143792 A1 Jun. 7, 2012

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

| 2005/0060290 A1 | | 3/2005 | Herscovici et al. | |
|---|---|---|---|---|
| 2005/0234877 A1 | * | 10/2005 | Yu | 707/3 |
| 2008/0195631 A1 | * | 8/2008 | Dom et al. | 707/10 |
| 2008/0235187 A1 | * | 9/2008 | Gade et al. | 707/3 |
| 2010/0179929 A1 | | 7/2010 | Yin et al. | |
| 2010/0223215 A1 | * | 9/2010 | Karypis et al. | 706/12 |
| 2011/0161260 A1 | * | 6/2011 | Burges et al. | 706/12 |

OTHER PUBLICATIONS

Baykan et al, Web Page Language Identification Based on URLs, Aug. 2008.*
Radlinski et al, Query Chains: Learning to Rank from Implicit Feedback, Aug. 2005.*
Yang et al, DiffusionRank: A Possible Penicillin for Web Spamming, Jul. 2007.*
Kim et al, Improving Web Page Classification by Label-propagation over Click Graphs, Nov. 2009.*
Lu, et al., "Link-based Classification using Labeled and Unlabeled Data", retrieved on Aug. 31, 2010 at <<http://www.eecs.wsu.edu/~holder/courses/cse6363/spr04/present/Lu03.pdf>>, Proceedings of ICML Workshop on the Continuum from Labeled to Unlabeled Data, Washington D.C., 2003, pp. 1-8.
Madhulatha, "A Study on Index Selection Problem", retrieved on Aug. 31, 2010 at <<http://www.articlesbase.com/computers-articles/study-on-index-selection-problem-2930457.html>>, ArticlesBase.com, Jul. 30, 2010, pp. 1-7.
Qin, et al., "Learning to Rank Relational Objects and Its Application to Web Search", retrieved on Aug. 31, 2010 at <<http://research.microsoft.com/en-us/people/tyliu/fp367-qin.pdf>>, ACM, Proceeding of International Conference on World Wide Web (WWW), Beijing, China, Apr. 2008, pp. 407-416.
Taskar, et al., "Discriminative Probabilistic Models for Relational Data", retrieved on Aug. 31, 2010 at <<http://robotics.stanford.edu/~koller/Papers/Taskar+al:UAI02.pdf>>, Proceedings of Conference on Uncertainty in Artificial Intelligence (UAI), Edmonton, Canada, 2002, pp. 485-492.

(Continued)

*Primary Examiner* — Jeffrey A Gaffin
*Assistant Examiner* — Mikayla Chubb
(74) *Attorney, Agent, or Firm* — Lee & Hayes, PLLC (57) ABSTRACT

Some implementations provide techniques for selecting web pages for inclusion in an index. For example, some implementations apply regularization to select a subset of the crawled web pages for indexing based on link relationships between the crawled web pages, features extracted from the crawled web pages, and user behavior information determined for at least some of the crawled web pages. Further, in some implementations, the user behavior information may be used to sort a training set of crawled web pages into a plurality of labeled groups. The labeled groups may be represented in a directed graph that indicates relative priorities for being selected for indexing.

20 Claims, 8 Drawing Sheets

(56) References Cited

OTHER PUBLICATIONS

Zhang, et al., "Linear Prediction Models with Graph Regularization for Web-page Categorization", retrieved on Aug. 31, 2010 at <<http://www.stat.rutgers.edu/homen/tzhang/papers/kdd06-graph.pdf>>, ACM, Proceedings of International Conference on Knowledge Discovery and Data Mining (KDD), Philadelphia, Pennsylvania, Aug. 2006, pp. 821-826.

Zhu, et al., "Integrating multiple document features in language models for expert finding", retrieved on Aug. 31, 2010 at <<http://www.cs.ucl.ac.uk/staff/J.Zhu/kais.pdf>>, Springer-Verlag London, Knowledge and Information Systems, vol. 23, No. 1, 2010, pp. 29-54, (published online Mar. 26, 2009).

* cited by examiner

PAGE SELECTION FOR INDEXING

BACKGROUND

Search engines may include web crawlers that automatically visit web pages on the World Wide Web (the Web) to create an index of the content of the web pages. For example, a web crawler may start with an initial set of web pages having known URLs. The web crawler downloads the web pages and extracts text and metadata reflecting the content of the web pages. The web crawler also extracts any new URLs (e.g., hyperlinks) contained in the downloaded web pages, and adds the new URLs to a list of URLs to be scanned. As the web crawler retrieves the new URLs from the list, and scans the new web pages corresponding to the new URLs, more text and metadata is extracted, and more URLs are added to the list. The text and metadata collected from the scanned web pages may be used to generate a searchable index for providing search services.

The Web has become very large and is estimated to contain over one trillion unique URLs. Further, crawling, storing and indexing web pages are resource-intensive processes, which use a large amount of both computing resources and storage resources. Thus, not all web pages on the Web are crawled. In addition, of the web pages that are crawled, search engines typically cannot index all of the collected information due to resource limitations. Thus, search engines may select only some of the crawled web pages for indexing.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques for determining which crawled web pages to select for indexing. In some implementations, the selection of web pages for indexing may be made based on a model that determines a priority of a web page for selection based on considerations such as link relationships with other pages, various page features and/or user behavior information.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Index Serve Selection

The technologies described herein generally relate to selecting web pages for inclusion in an index, referred to herein as "page selection" or "index serve selection." For example, when selecting web pages for indexing, some implementations herein may be configured to select those pages for which people are likely to search, i.e., pages that have information that people will want to access. Thus, certain web pages may be determined to have greater importance or have a higher priority for indexing than other web pages. Some implementations apply machine-learning techniques for page selection that may include regularization. For example, a model may apply regularization for selecting crawled pages for inclusion in an index by considering inter-pages dependencies, various features determined for the pages, and user behavior with respect to the pages. Further, while several examples are described herein in the context of web pages on the Web, implementations are not limited to web pages, and may be extended, for example, to items of information that are accessible on private networks, intranets, and the like.

Some implementations herein define labels that are employed for assisting in determining which pages to select for indexing. Thus, labels may be defined and assigned to groups pages for use in a page selection strategy. For example, a training set of pages may be sorted into labeled groups based on gathered user behavior data. Some labeled groups may be assigned a higher priority for being selected for indexing than other labeled groups. Further, there may be multiple sources of data that can be used to define and determine appropriate labels or classifications for the sorted groups of pages. Sources of label data may include user behavior information, such as click information, sampled queries and results, bookmark data, relevance data, spam data, abandoned queries, and so forth. The labels for the groups may be defined based on information combined from the multiple sources to generate a label graph. The label graph may be a directed graph that represents relative priority of each labeled group for selection for indexing. The label graph used in conjunction with other information, such as web page feature information and URL link information to generate and use a model for page selection, as described additionally below.

Implementations herein may also take into account, during the page selection, a plurality of features identified from the crawled web pages. For example, features that may be considered can include: ranking features, such as page rank, domain rank, number of in-links, etc.; URL features, such as URL length, number of hyphens in a URL, number of digits in a URL, URL depth, etc.; click features, such as number of clicks during different types of user browsing behavior; graph propagation features based on URL graph propagation to obtain projected aggregated clicks, user satisfaction, etc.; document features, such as page length, topics of the page, number of ads in the page, etc.; and link or edge features, such as whether a hyperlink is a link between two pages within the same website or at different sites, number of hyperlinks between two pages, and the like.

Some implementations include generation of a model from a set of training data and subsequent use of the model for page selection. To generate a trained model for use during page selection, the label graph, the extracted page and edge features, and the linking relationships between web pages (e.g., obtained from a URL link graph) may be used. According to some implementations, the page selection techniques herein may be modeled as a subset selection problem that takes into consideration the inter-pages dependencies of the crawled pages. Further, graph-based regularization may be used for improving the selection quality. Consequently, as a result of the regularization, a page that is pointed to by another page that has been determined to be important may still be regarded as important for being selected, despite certain labels or features indicating the contrary.

Example Framework

Figure 1:
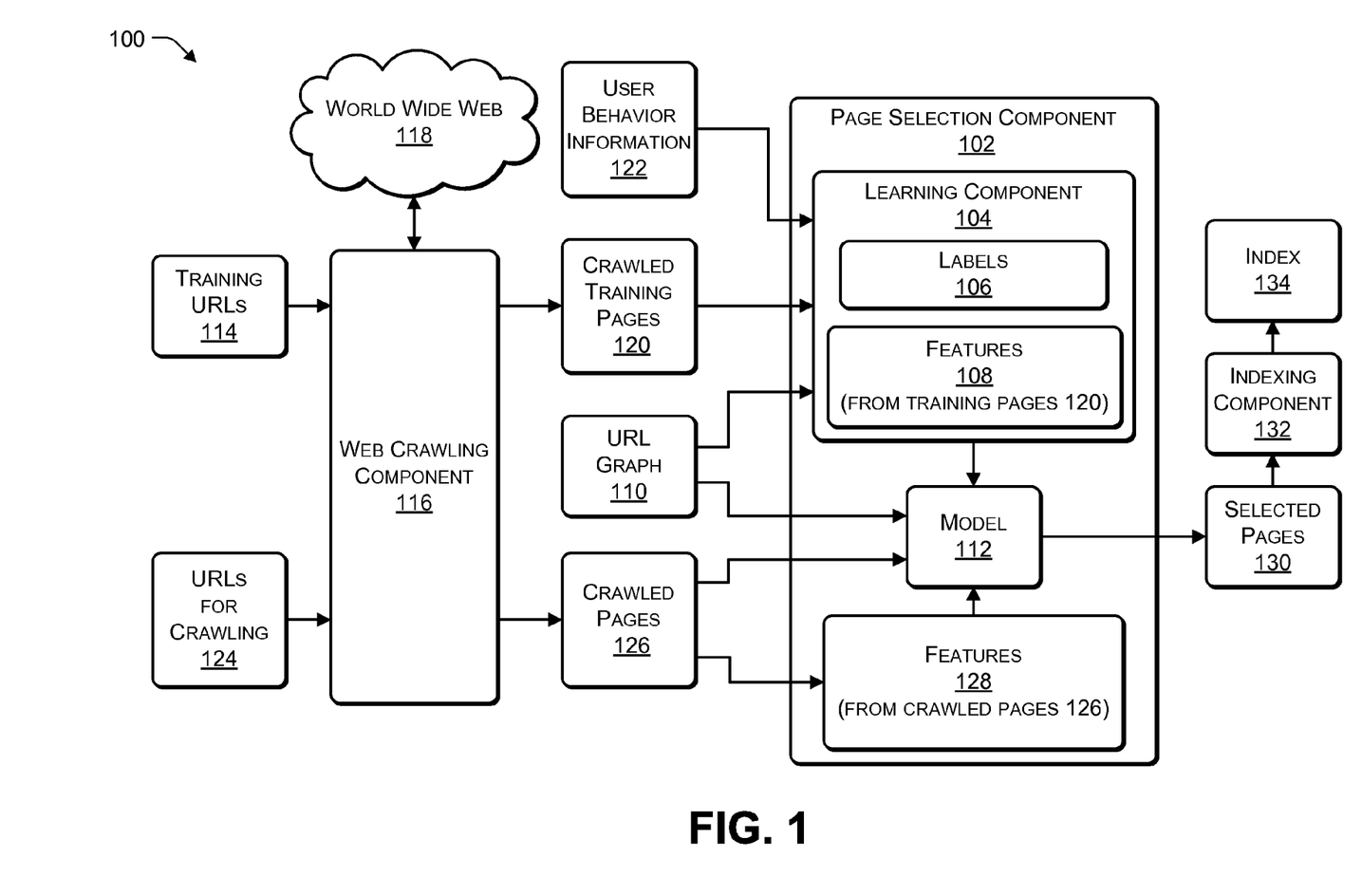
FIG. 1 is a block diagram of an example framework for model generation and page selection according to some implementations.

FIG. 1 is a block diagram of an example framework 100 for page selection according to some implementations. Framework 100 includes a page selection component 102 configured to select pages for indexing. In a learning or training stage, page selection component 102 employs a learning component 104. During the training stage, learning component 104 may utilize labels 106, features 108 obtained from crawled training pages, and a URL graph 110 to generate a model 112 to be used to select pages for indexing. For example, to generate or train the model 112, a plurality of training URLs 114 may be provided to a web crawling component 116. In some implementations, the set of training URLs 114 may be on the order of several million URLs. The web crawling component 116 accesses the World Wide Web 118 to crawl the training URLs 114.

As a result of crawling the training URLs 114, the web crawling component 116 provides crawled training pages 120 to the learning component 104. The learning component 104 may extract the features 108 from the crawled training pages 120. As mentioned above, features 108 may include various web page features, such as ranking features, URL features, click features, graph features, document features and edge features. Further, learning component 104 may also receive various types of user behavior information 122 that may be employed for generating the labels 106. For example, user behavior information 122 may include click information, such as which pages were clicked by users and which were not, sampled queries and the corresponding search results, bookmark data, human label or tag data indicating relevance, human label data indicating spam, and other information from user behavior logs. Based on the user behavior information 122, the crawled training pages may be sorted into groups, and positive and negative labels may be determined for the various groups.

URL graph 110 may be a graph data structure in which URLs are the vertices of the graph and the links between the URLs (e.g., hyperlinks) are the edges of the graph. Thus, URL graph 110 may represent the link relationships between the training URLs 114. URL graph 110 may also include other URLs and links, as the other URLs and links become known, such as during subsequent crawling of additional URLs during a selection stage. Thus, graph 110 may be a very large directed graph of the currently known link relationships between currently known URLs. As will be described in additional detail below, learning component 104 generates or trains the model 112 based on the labels 106, the features 108 and the URL graph 110.

Following generation of the model 112, selection component 102 may be operated in a use or selection stage. During the selection stage, a plurality of additional URLs for crawling 124 are provided to the web crawling component 116. In some implementations, the URLs for crawling 124 may be on the order of many billions of URLs. The web crawling component 116 accesses the Web 118 to crawl the plurality of URLs for crawling 124. As a result of the crawling, the web crawling component 116 provides a plurality of corresponding crawled pages 126 to the page selection component 102 for index serve selection. The page selection component 102 determines features 128 for the crawled pages 126, similar to the features 108 described above. The URL graph 110 is also updated with the current known URLs and known links to include the URLs for crawling 124. The page selection component 102 applies the features 128, and the updated URL graph 110 to the model 112 to determine a subset of the crawled pages 126 to select for indexing as selected pages 130. The selected pages 130, as the selected subset of the crawled pages 126, may be provided to an indexing component 132. The indexing component 132 uses information from the selected pages 130 to generate an index 134.

Labeling

Figure 2:
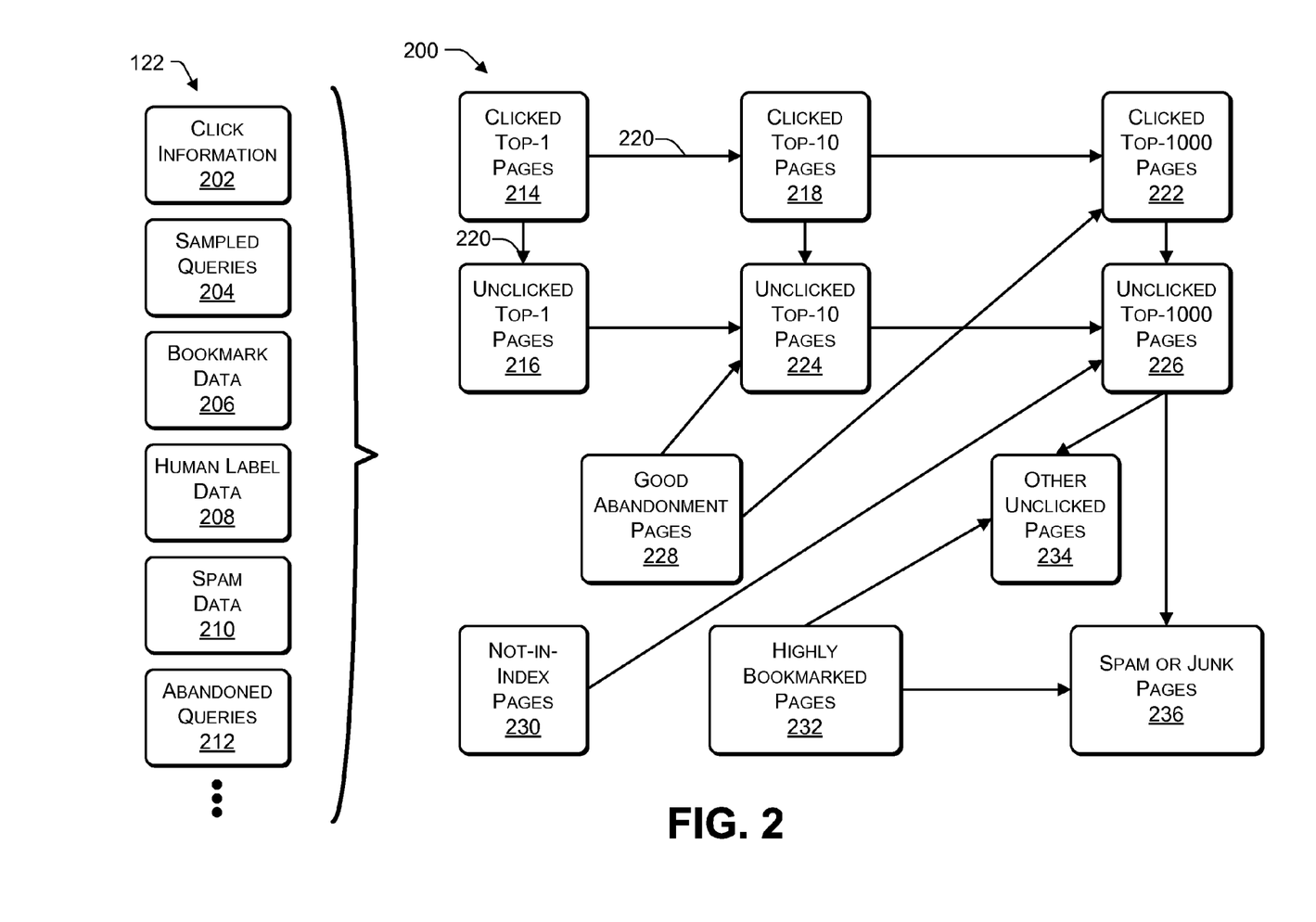
FIG. 2 is an example of a label graph representing relative priorities of labeled pages for index selection according to some implementations.

FIG. 2 illustrates an example of a label graph 200, which is a directed graph data structure that represents a priority hierarchy between labels and labeled groups based on information combined from the multiple sources. As mentioned above, the machine-learning techniques herein may include a labeling strategy to categorize or label certain types or categories of pages that have a priority for being selected for indexing. Thus, some implementations label certain pages as having a high priority for being selected and label other pages as having lower priorities for being selected.

Some implementations may employ multiple sources of user behavior information 122 that can be used for defining the labels. For example, user behavior data 122 may be obtained from various sources, such as from mining browser toolbar logs of users, user-provided search logs, or other user-provided information. For instance, users of a web browser may consent to having their browsing history data provided anonymously (or not) to a search engine provider. Thus, the browsing logs and search logs of a large number of users may be provided from a browser or browser toolbar to the search engine provider. This browsing history data may be mined by the learning component 104 to provide sources of user behavior information 122.

Examples of user behavior information 122 may include click information 202 that is extracted from the user behavior information 122. For example, some implementations may determine which pages were clicked or visited by users and which were not, and the corresponding number of clicks or visits from multiple users can also be extracted.

Further, sampled queries 204 and the corresponding search results may also be used to determine which pages exist in the top-1 position, which pages exist in the top-10 (i.e., 2-10) positions, and which pages exist in the top-1000 (i.e., 11-1000) positions of ranked search results. Further, the log data may show which of these pages were actually selected or clicked-on by the users.

Additionally, the user behavior information 122 may also include bookmark data 206. The bookmark data 206 may show how many times a particular web page has been bookmarked by users, which can be an indicator of the importance of the web page.

User behavior information 122 may also include human label data 208, which may be labels or tags that user apply to particular pages. For example, the human label data 208 may indicate relevance of a page to a particular topic, and may be used for determining whether some pages that are relevant to some queries are not in the index of the search engine.

User behavior information 122 may also include spam data 210 that may be obtained from users indicating that certain pages are spam or junk pages. Consequently, based on the spam data 210, implementations may determine that a particular page has been identified as a spam or junk page by multiple users, and is probably not desirable for indexing.

Additionally, from the user behavior information 122, some implementations may extract some queries that resulted in no pages being clicked. These queries may be referred to as abandoned queries 212. Further, it is possible to differentiate between good abandonments and bad abandonments in these results. For instance, in the good abandonments, the user's search intent may have been satisfied by a good result without the user to actually clicking on a result (e.g., displayed snippets are assumed to have answered the user's search intent, and the corresponding pages are therefore considered to be of high quality). These good abandonment pages may be assigned a higher priority be selected for indexing. Bad abandonment, on the other hand, indicates that none of the results appeared to the user to be worth clicking on, and may be indicted by a subsequent similar query submitted by the user.

As the various sources of label information are substantially different from each other, the use of a single source or type of information to define positive and negative labels may not provide an optimal result. Accordingly, some implementations use at least several of the multiple sources of user behavior information 122 described above to generate a directed graph of label groups based on the multiple sources or types of user behavior information 122. Thus, based on the user behavior information 122, some implementations sort the crawled training pages 120 into different groups by assigning relative ordinal or hierarchical relationships between the various labeled groups based on relative priority for page selection. By aggregating all possible partial orders, a directed relation graph may be obtained that represents relative levels of importance or priority of the labeled groups for page selection. Thus, in label graph 200, an arrow from one block to another indicates a partial order or relative priority between the two blocks.

For example, clicked top-1 pages 214 represent a labeled group of pages that were the top-1 listed page in a search result and that were also clicked on or selected by the user conducting the search. Thus, it is desirable to give these pages a high priority for indexing selection. Accordingly, the pages that are grouped or labeled as clicked top-1 pages 214 may have a higher priority for being selected than unclicked top-1 pages 216 or clicked top-10 pages 218, as indicated by the directed edges 220 that are outbound from the clicked top-1 pages 214. Thus, the labeled page groups represented in label graph 200 may be scattered partial order pairs, indicating pairwise priority relationships between the labeled groups of pages.

In label graph 200, hierarchical selection priority relationships are established for the various different types of labeled groups established for the crawled training pages 120 obtained from the set of training URLs 114. For example, the training URLs 114 and crawled training pages 120 may be cross-referenced with the user behavior data 122 for sorting the crawled training page 120 into the labeled groups and for establishing the label graph 200. In the label graph 200, the clicked top-1 pages 214 have the highest priority for selection, as indicated by the edges 220 outbound to unclicked top-1 pages 216 and clicked top-10 pages 218. Further, clicked top-10 pages 218 have a higher priority than clicked top-1000 pages 222 or unclicked top-10 pages 224, and both of these have a higher priority for selection than unclicked top-1000 pages 226. In addition, good abandonment pages 228 also have a higher priority than clicked top-1000 pages 222 or unclicked top-10 pages 224, while not-in-index pages 230 have a higher priority than the unclicked top-1000 pages 226. Highly bookmarked pages 232 and the unclicked top-1000 pages 226 have a higher priority than other unclicked pages 234 and spam or junk pages 236.

Once the label graph 200 has been determined using the training URLs 114, the priority hierarchy established for the label graph 200 may be applied in the model 112 during the online or selection stage. Accordingly, by sorting or categorizing crawled web pages into one of these label groups based on the user behavior information 122, a hierarchical priority for selection may be established for each of the crawled web pages relative to the other crawled web pages. Further, in some implementations, to ensure that the user behavior information 122 is relevant to the crawled training pages 120, the training URLs 114 may be drawn, at least in part from the user behavior information 122.

Features

Some implementations may take into consideration one or more web page features 108, 128 when selecting pages for indexing. For example, features that may be extracted for each page during index selection may include one or more of ranking features, URL features, click features, graph features, document features or edge features.

Ranking features may be based on the number of links for a page, such as a page rank, a domain rank, number of links pointing to a page, etc., and may be an indication that a page is important or is valuable for being included in the index. For example, a page rank may be established using the PageRank® algorithm or other link-based algorithm. Further a domain rank or other link-based ranking may also or alternatively be determined for the pages.

URL features, such as length of a URL for a page, number of hyphens or other special characters in the URL, number digits compared with a number of letters or words in a URL, URL depth in a web site, etc., may also indicate a value of a page for indexing. For example, URLs that are very long, that have a high number of hyphens or special characters, a large number of digits, or that are buried deep within a web site, typically are less important than shorter URLs having words.

Click features, such as the click number of a page in different types of user browsing behavior (collected from user browsing or search log data, etc.) may be used to determine a value of a page. For example, user log data may show that a particular page has been clicked on or visited a number of times by various different users. Thus, such a page may be considered valuable for indexing.

The graph propagation feature of a page refers to graph propagation that may be used to obtain projected aggregated clicks, user satisfaction, or the like for a page. For example, many pages may not have any user log data that refers to those pages, so click features cannot be determined directly. However, implementations herein may determine from the URL graph 110 that a particular page is linked from another page that has a high click rate. For example, the other page may have a higher-than-average click rate, or a click rate over a predetermined threshold click rate. Determined user satisfaction with a page and other detectable attributes may be similarly propagated. Thus, based on the graph information, the click features of a first page may be propagated or imbued to a linked page.

Document features that may be used to determine the value of a page for indexing include page length, topics of the page, number of ads in the page, and the like. For example if a page has a large number of advertisements, then the page is most likely a spam page and not useful for indexing. Further if a web page is very short, then there may not be any useful information in the page.

Additionally, characteristics or attributes of the links between pages can also be considered as features for page selection, referred to herein as "edge features" (i.e., links between pages are represented as edges in the URL graph 110 described below). Examples of edge features that may be considered can include whether the hyperlink between two pages is an inter-website link or an intra-website link. Other edge features may include the number of real or separate hyperlinks between the two pages, and so forth. The edge features can be attached to or associated with the two pages involved, and included as the features 108 or 128 for those pages.

The foregoing is a non-exhaustive, non-limiting list of features that may be considered during the page selection techniques herein. In use, some of the above-listed features may be very sparse; accordingly some implementations may perform smoothing of the features, such as by using relative weighting factors for the features.

URL Graph

Figure 3:
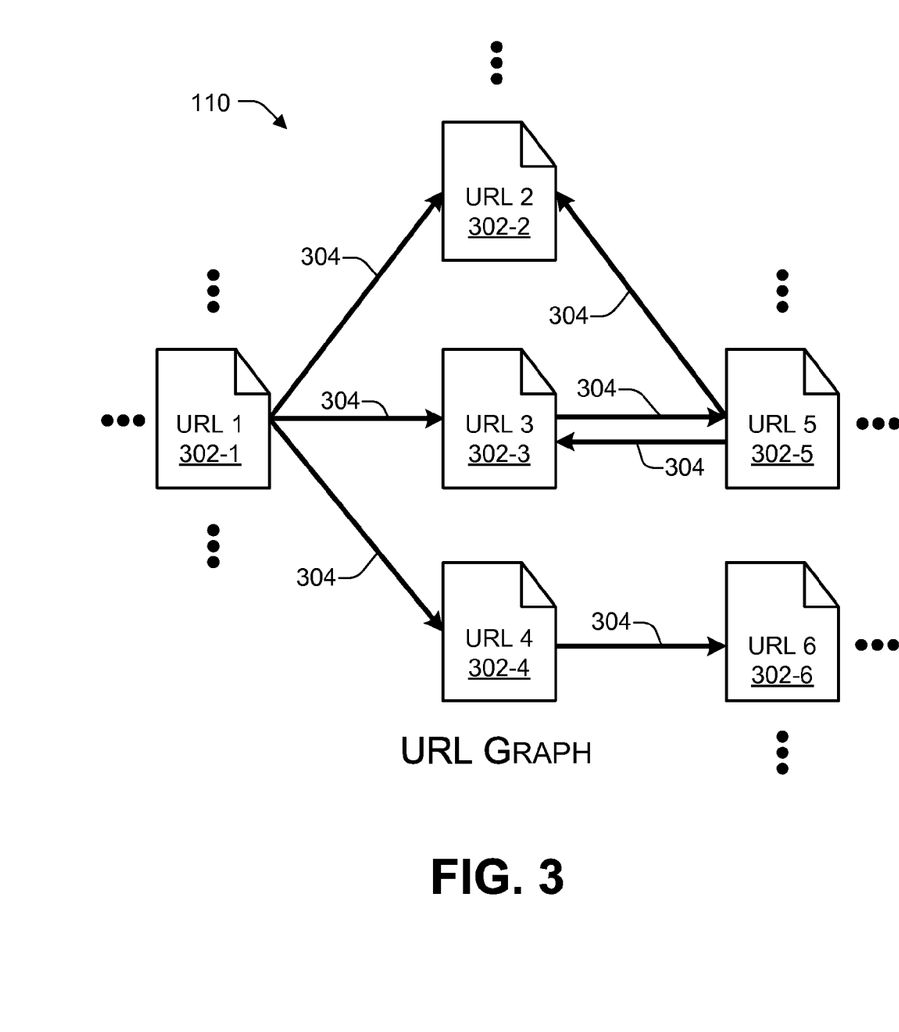
FIG. 3 is an example of a URL graph representing link relationships between URLs according to some implementations.

FIG. 3 illustrates an example of URL graph 110, which may be generated based on the link relationships between known URLs according to some implementations. For example, the training URLs 114 may be modeled as a directed graph data structure in which the URLs 302 are the vertices of the graph and links 304 between the URLs form the edges of the graph. Consequently, the training URLs 114 and the linking relationships there between may be represented as a very large graph data structure. Furthermore, as the URLs for crawling 124 are crawled, and their link relationships become known, these URLs 124 may also be included in the URL graph 110.

In the illustrated example of FIG. 3, URLs 1-6, 302-1, . . . , 302-6, respectively, represent a very small example portion of the URL graph 110 for discussion purposes. In the URL graph 110, URL 1 is linked to URL 2, URL 3, and URL 4; URL 2 is linked from URL 1 and from URL 5; URL 3 is linked from URL 1 and linked from and to URL 5; URL 4 is linked from URL 1 and linked to URL 6; URL 5 is linked to URL 2 and URL 3 and linked from URL 3; and URL 6 is linked from URL 4. As described below, the URL graph 110, along with the labels and features discussed above, may be applied for selecting crawled pages for indexing.

Learning with Graph-Based Regularization

Some implementations herein employ a subset selection model that may consider inter-pages dependencies based on the URL graph 110. This dependency can be reflected by graph-based regularization, which may be similarity-based or preference-based. Generally, regularization is a technique for preventing overfitting in a model having a large number of variables. In addition, the hierarchical pairwise relationships provided by the label graph 200 can be used to define loss functions. Thus, for selection of pages for indexing, the learning techniques herein may combine graph-based regularization and the loss functions. Further, with such a formulation, these implementations are also able to cope with the sparseness of the page features discussed above.

As mentioned above, the graph-based regularization herein may be similarity-based or preference-based. For example, a similarity-based regularization item may be defined according to domain diversity, topic diversity, or diversity based on a distance on the URL graph. With a diverse selection, it is more likely that these implementations will be able to satisfy a random user's desire for random information. On the other hand, a preference-based regularization item may be defined according to the directed URL graph. In preference-based regularization, while the page importance may be determined by various factors (e.g., according to user behavior information and page and edge features), a page pointed to by an important page will still be regarded as being important itself.

For both the similarity-based regularization items and the preference-based regularization items, an optimization equation for the page selection model may be expressed as follows:

$$\min_{s.t. \omega > 0, \pi > 0} L(\omega, \pi) = \min_{s.t. \omega > 0, \pi > 0} \{R(\omega, \pi) + cS(B, \pi)\} \quad (1)$$

Here $\pi$ is an n-dimensional vector to indicate whether a page is selected for indexing, i.e., $$\pi_i = \begin{cases} 1, & \text{page } i \text{ is selected} \\ 0, & \text{page } i \text{ is not selected} \end{cases},$$

(i=1, . . . , n), where n is the number of pages; $\omega$ is a k-dimensional parameter vector for k page features and/or edge features; $R(\omega, \pi)$ is the regularization term; $S(B, \pi)$ is the loss term to minimize the difference between the training data and the information in the supervision matrix B, where B is a supervision matrix defined based on the priority hierarchies of the labels of directed label graph 200, and c is a weighting parameter.

Thus, the regularization term R may be a link function based on the URL graph 110. In some implementations the link function may correspond to a link-based algorithm, such as the PageRank® algorithm or other link analysis algorithms Additionally, $\omega$ is a vector for taking into consideration the various page and edge features 108, 128 described above, i.e., each of the features taken into consideration is one of the parameters of the vector $\omega$. In the learning process, through optimization equation (1), implementations herein may obtain both $\omega$ and $\pi$. For example, the weight of each of the features in $\omega$ is applied and becomes known through the vector parameters. In addition, $S(B, \pi)$ is a loss function term that applies the relative priority information of the label graph 200. Whether or not a page is ultimately selected for indexing may be based on whether the value of $\pi$ is determined to be 1 (selected) or 0 (not selected).

By minimizing the objective function $L(\omega, \pi)$, some implementations may obtain an optimized selection value $\pi$ for index page selection. When the regularization item takes some specific forms, in some implementations, the optimization and selection may be performed by computation clusters using a map-reduce strategy, which may have a time complexity of the same order as the number of edges in the URL graph 110. For example, in some implementations, the optimized selection may be executed by a distributed processing environment based on a map-reduce framework.

Page Selection

Figure 4:
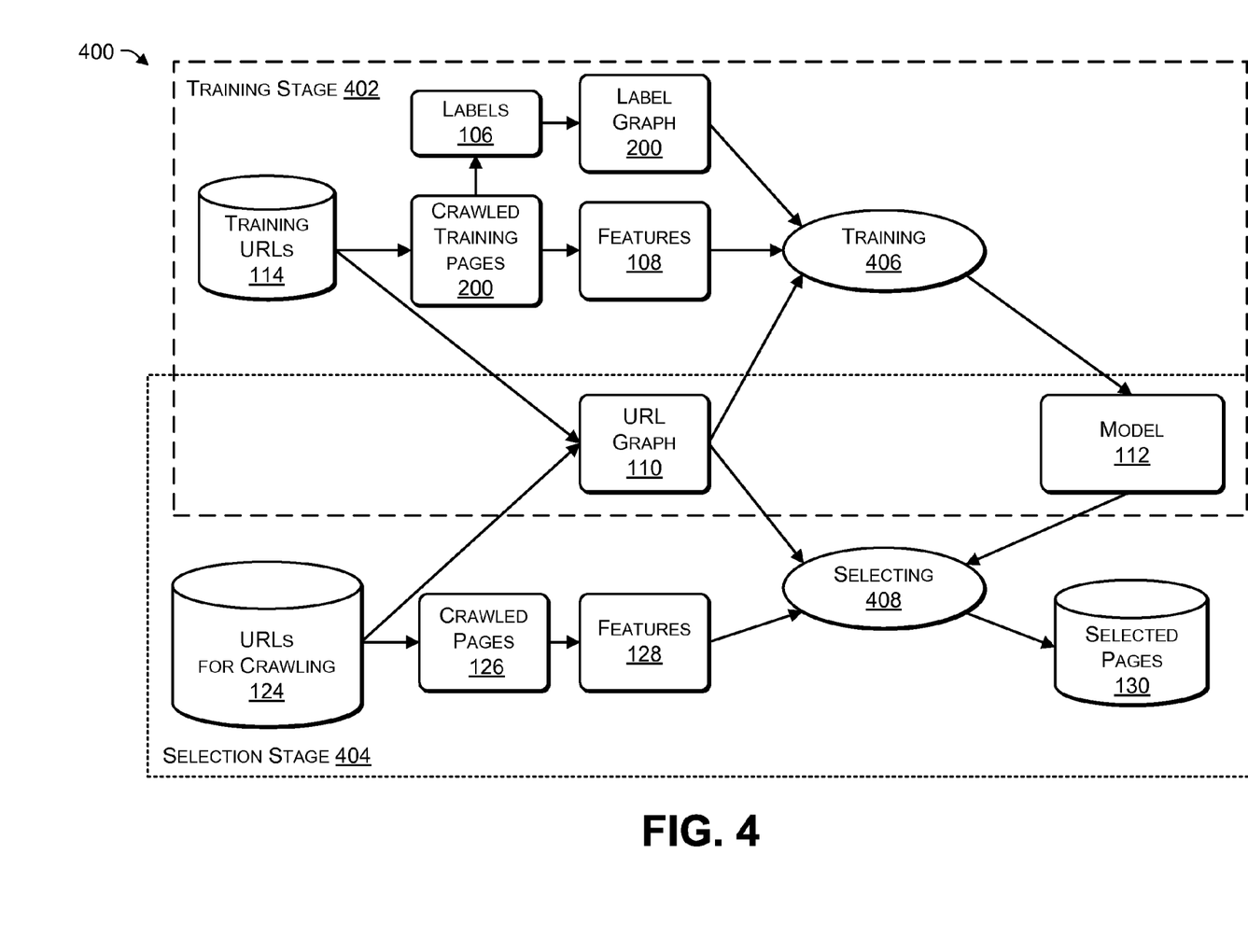
FIG. 4 is a block diagram illustrating interrelationships between elements of the training stage and the selection stage for selecting crawled pages for indexing according to some implementations.

FIG. 4 is a block diagram that illustrates interrelationships 400 between a training stage 402 and a selection stage 404 for selecting crawled pages for indexing according to some implementations. In the training stage 402, the training URLs 114 are crawled and features 108 are extracted from the crawled training pages 120, as described above. Further, labels 106 are defined for groups of the crawled training pages and the directed label graph 200 is generated, as described above with respect to FIG. 2. Additionally, the link relationships between training URLs 114 may be used to generate or update URL graph 110, as described above with respect to FIG. 3. The label graph 200, the features 108 and the URL graph 110 may be applied according to equation (1) during training 406 to establish a model 112.

During the selection stage 404, the URLs for crawling 124 are crawled, resulting in crawled pages 126. Features 128 are extracted from crawled pages 126. Further, the URLs for crawling 124 and their link relationships are added to the URL graph 110. The URL graph 110 and the features 128 are applied to the trained model 112 during selecting 408 to select a subset of pages from the crawled pages 126 as the selected pages 130. As described above, the selected pages may be provided to an indexing component for indexing. Thus, the model 112 takes into consideration the links between URLS, the features of particular pages, and an established priority hierarchy for various types of user behavior with respect to the pages when performing the selecting 408.

Example Training Process

Figure 5:
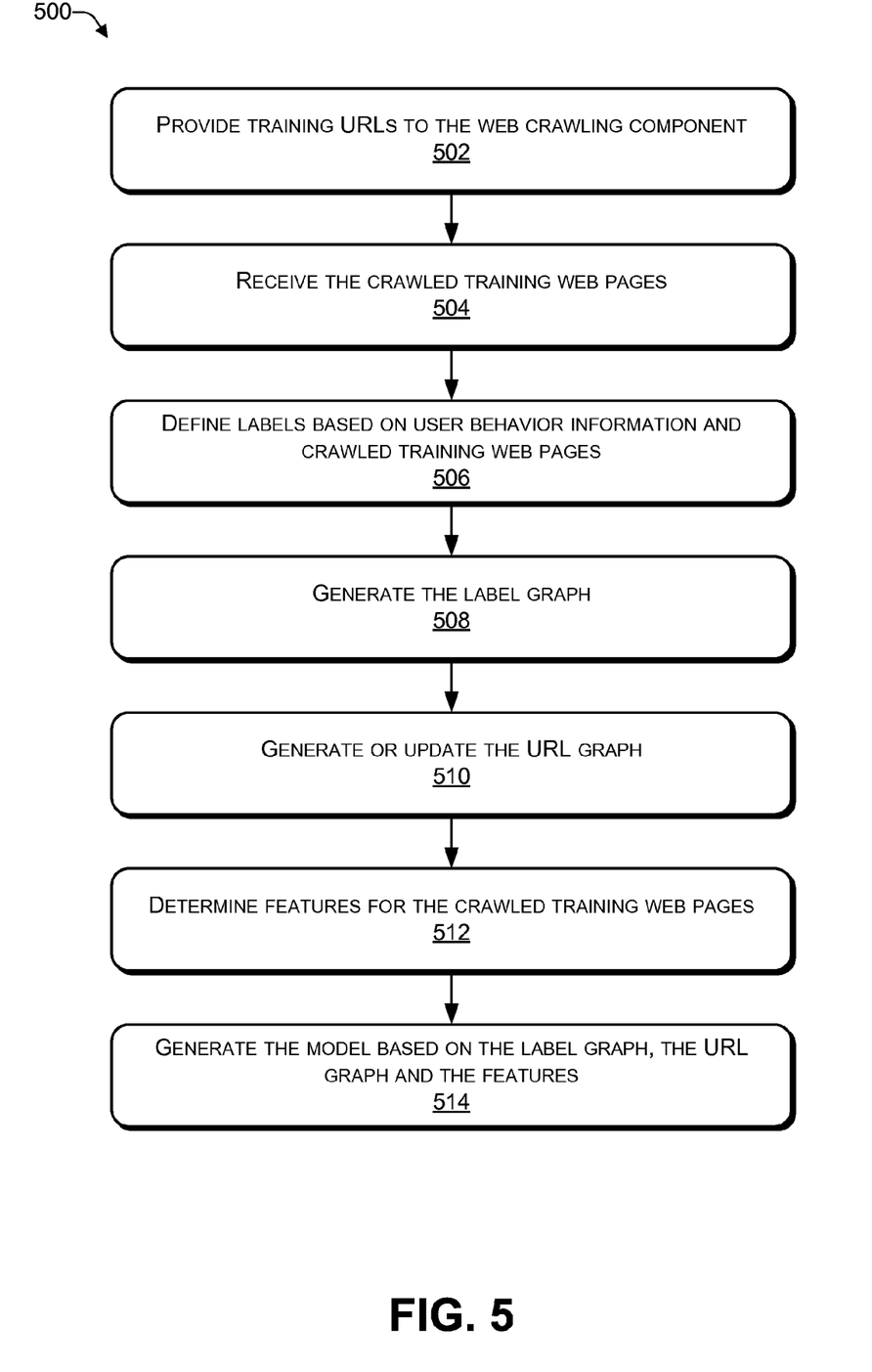
FIG. 5 is a flow diagram of an example process for training a model for page selection according to some implementations.

FIG. 5 is a flow diagram of an example process 500 for generating a model for use in selecting pages for indexing according to some implementations herein. In the flow diagram of FIG. 5, as well as in the flow diagram of FIG. 6, each block represents one or more operations that can be implemented in hardware, software, or a combination thereof In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. For discussion purposes, the process 500 is described with reference to the framework 100 of FIG. 1, although other frameworks, devices, systems and environments may implement this process.

At block 502, the training URLs 114 may be provided to the web crawling component 116. For example, a large set of training URLs 114, in the order of several million, may be provided to the web crawling component 116.

At block 504, the web crawling component 116 provides the crawled training web pages 120 corresponding to the training URLs 114 to the page selection component 102.

At block 506, the learning component 104 defines a plurality of labels 106 based on user behavior information 122 and the crawled training web pages 120. For example, the labels may be defined based on user behavior information 122 obtained from user-provided browsing logs and/or search logs. In some implementations, the user behavior information 122 may include click information, sampled queries, bookmark data, human label data, spam data, and/or abandoned queries. Further, the crawled training web pages 120 may be sorted and grouped in labeled groups based on the user behavior information 122.

At block 508, the learning component 104 generates the label graph 200 from the defined labels 106 and the labeled groups of the sorted crawled training web pages 120. For example, the label graph 200 may be generated as a directed graph indicating a hierarchical selection priority for different labeled groups of the crawled training web pages 120.

At block 510, the URL graph 110 is generated or updated with URL and/or link information for the training URLs 114. For example, the URL graph 110 may be a directed graph indicating link relationships between the training URLs 114.

At block 512, the learning component 104 determines various features for the crawled training web pages 120. For example, the learning component 104 may extract various page and URL features for each page such as ranking features, URL features, click features, graph-propagated features or document features.

At block 514, the learning component 104 generates the model 112 based on the label graph 200, the URL graph 110, the features 108, and equation (1), as described above. For example, the model 112 may employ graph-based regularization based on the link relationships in the URL graph 110 and the features 108, and may also employ a mitigating loss function based on the label graph 200.

Example Selection Process

Figure 6:
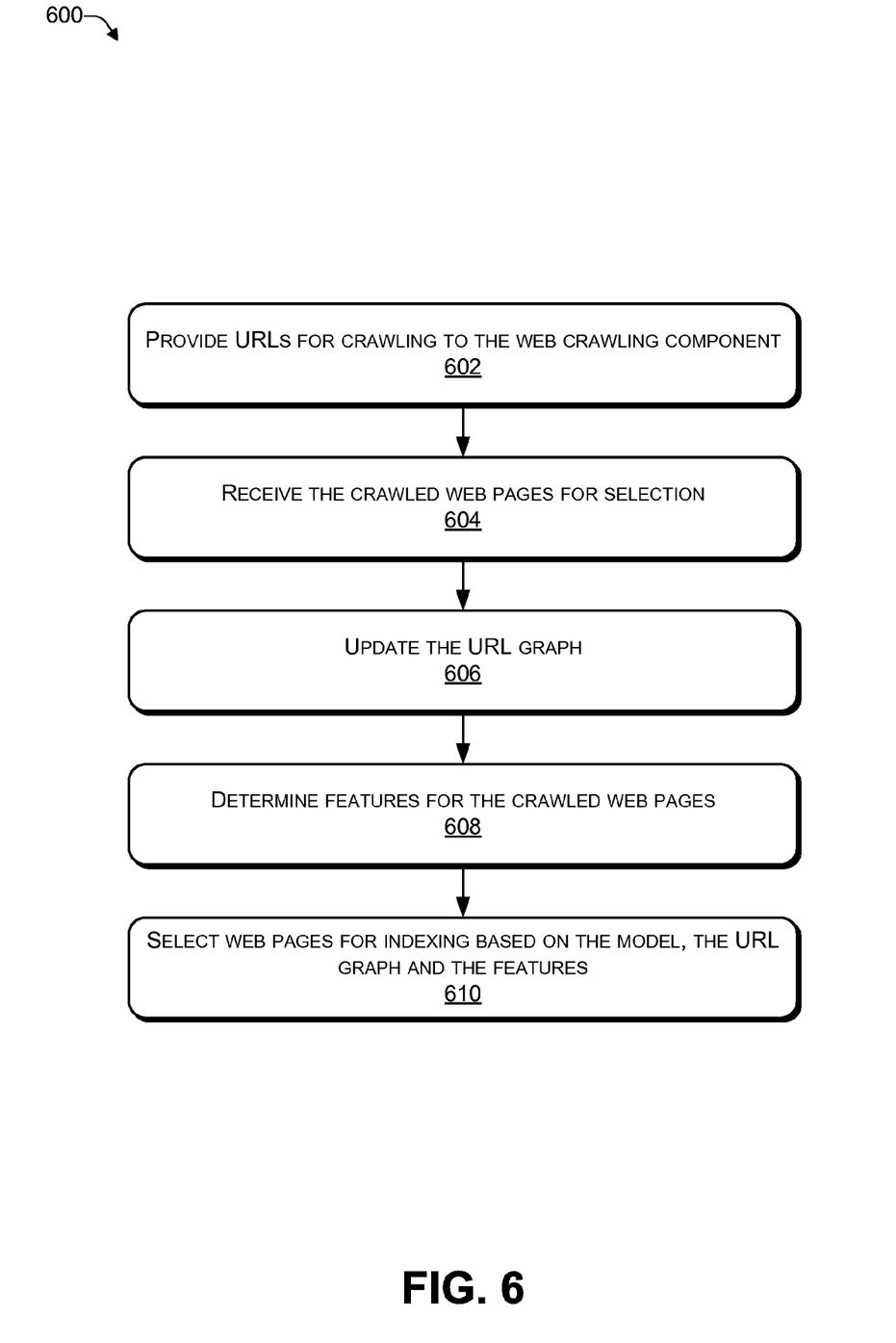
FIG. 6 is a flow diagram of an example process for selection of pages for indexing according to some implementations.

FIG. 6 is a flow diagram of an example process 600 for selection of pages for indexing according to some implementations herein. For discussion purposes, the process 600 is described with reference to the framework 100 of FIG. 1, although other frameworks, devices, systems and environments may implement this process.

At block 602, the URLs for crawling 124 may be provided to the web crawling component 116. For example, the URLs for crawling 124 may be in the order of billions of URLs provided to the web crawling component 116.

At block 604, the web crawling component 116 provides the crawled pages 126 to the page selection component 102.

At block 606, the URL graph 110 is updated with URL and/or link information from the URLs for crawling 124.

At block 608, the page selection component 102 extracts various features 128 for each of the crawled web pages 126, such as ranking features, URL features, click features, graph features or document features.

At block 610, the page selection component 102 selects, for indexing, a subset of the crawled web pages 126 based on the URL graph 110, the extracted features 128 and the model 112. Thus, when performing the selecting, the model 112 takes into consideration the links between URLs, the features of particular pages, and an established priority hierarchy for various types of user behavior with respect to the pages.

Example System Architecture

Figure 7:
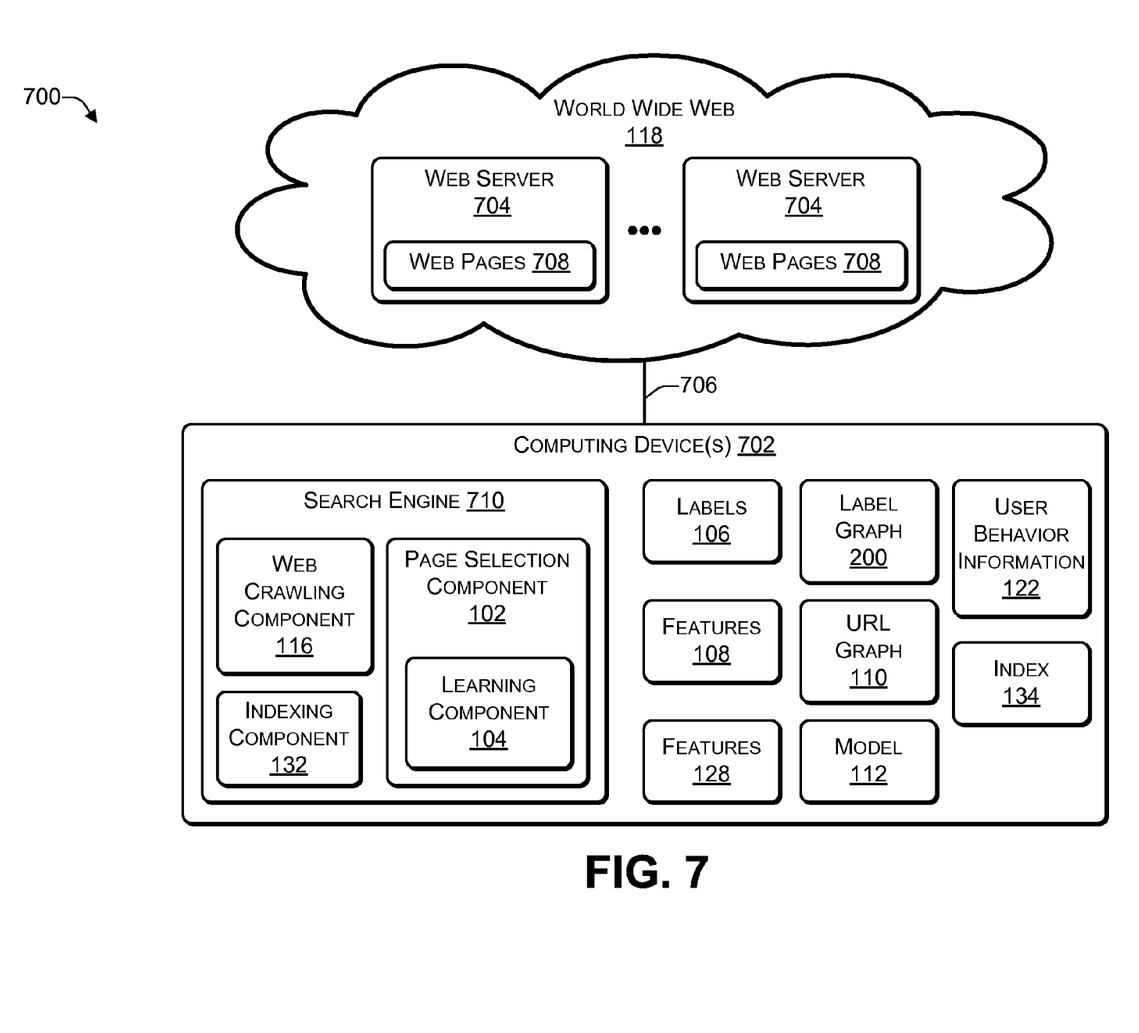
FIG. 7 is a block diagram of an example system architecture according to some implementations.

FIG. 7 is a block diagram of an example system architecture 700 according to some implementations herein. In the illustrated example, architecture 700 includes at least one computing device 702 able to communicate with a plurality of web servers 704 on the World Wide Web 118. For example, the computing device 702 may communicate with the web servers 704 through a network 706, which may be the Internet and/or other suitable communication network enabling communication between the computing device 702 and the web servers 704.

Each web server 704 may host or provide one or more web pages 708 having one or more corresponding URLs that may be targeted for crawling by a search engine 710 on the computing device 702. For example, search engine 710 may include the web crawling component 116 for collecting information from each web page 708. Search engine 710 may include the page selection component 102 and the learning component 104. Search engine 710 may further include the indexing component 132 for generating the index 134 based on information collected by the web crawling component 116 from the web pages 708. Furthermore, computing device 702 may include additional data described above such as the labels 106, the features 108, the URL graph 110, the model 112, the user behavior information 122, the features 128, and the label graph 200.

Example Computing Device and Environment

Figure 8:
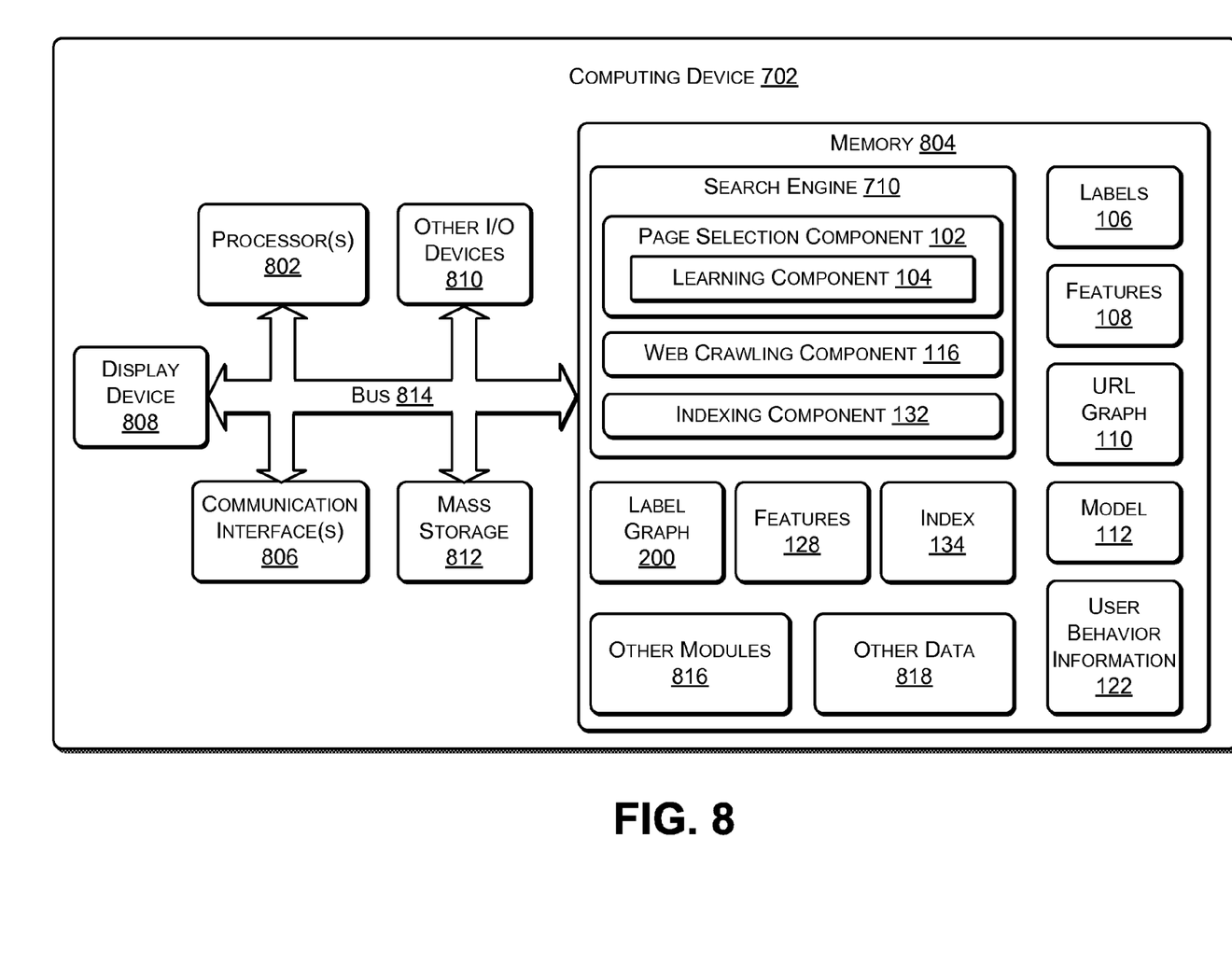
FIG. 8 is a block diagram of an example computing device and environment according to some implementations.

FIG. 8 illustrates an example configuration of the computing device 702 that can be used to implement the components and functions described herein. The computing device 702 may include at least one processor 802, a memory 804, communication interfaces 806, a display device 808, other input/output (I/O) devices 810, and one or more mass storage devices 812, able to communicate with each other, such as via a system bus 814 or other suitable connection.

The processor 802 may be a single processing unit or a number of processing units, all of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions stored in the memory 804, mass storage devices 812, or other computer-readable storage media.

Memory 804 and mass storage devices 812 are examples of computer-readable storage media for storing instructions which are executed by the processor 802 to perform the various functions described above. For example, memory 804 may generally include both volatile memory and non-volatile memory (e.g., RAM, ROM, or the like). Further, mass storage devices 812 may generally include hard disk drives, solid-state drives, removable media, including external and removable drives, memory cards, Flash memory, floppy disks, optical disks (e.g., CD, DVD), a storage array, a network attached storage, a storage area network, or the like. Both memory 804 and mass storage devices 812 may be collectively referred to as memory or computer-readable storage media herein. Memory 804 is capable of storing computer-readable, processor-executable program instructions as computer program code that can be executed by the processor 802 as a particular machine configured for carrying out the operations and functions described in the implementations herein.

The computing device 702 may also include one or more communication interfaces 806 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like. Communication interfaces 806 can also provide communication with external storage (not shown), such as in a storage array, network attached storage, storage area network, or the like.

A display device 808, such as a monitor may be included in some implementations for displaying information to users. Other I/O devices 810 may be devices that receive various inputs from a user and provide various outputs to the user, and may include a keyboard, a remote controller, a mouse, a printer, audio input/output devices, and so forth.

Memory 804 may include modules and components for web crawling and page selection according to the implementations herein. In the illustrated example, memory 804 includes the search engine 710 described above that affords functionality for web crawling and indexing to provide search services. For example, as discussed above, search engine 710 may include the page selection component 102, the learning component 104, and the web crawling component 116. Additionally, search engine 710 also may include the indexing component 132 for generating the index 134. Memory 804 may also include other data and data structures described herein, such as the labels 106, the features 108, the URL graph 110, the model 112, the user behavior information 122, the features 128, and the label graph 200. Memory 804 may further include one or more other modules 816, such as an operating system, drivers, communication software, or the like. Memory 804 may also include other data 818, such as the crawled pages 120, 126, other data stored by the page selection component 102 to carry out the functions described above, and data used by the other modules 816.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 8 as being stored in memory 804 of computing device 702, page selection component 102, or portions thereof, may be implemented using any form of computer-readable media that is accessible by computing device 702. Computer-readable media may include, for example, computer storage media and communications media. Computer storage media is configured to store data on a non-transitory tangible medium, while communications media is not.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
under control of one or more processors configured with executable instructions,
receiving crawled web pages corresponding to a plurality of uniform resource locators (URLs) provided to a web crawler;
sorting the crawled web pages into a plurality of labeled groups based at least in part on user behavior information reflecting behavior of users with respect to at least some of the crawled web pages; and
establishing one or more hierarchical relationships between the plurality of labeled groups based at least in part on a determined relative priority of each labeled group for inclusion in an index, the one or more hierarchical relationships between the plurality of labeled groups including at least one hierarchical relationship between a first labeled group of the plurality of labeled groups and a second labeled group of the plurality of labeled groups.

2. The method according to claim 1, further comprising representing the one or more hierarchical relationships between the plurality of labeled groups in a directed graph in which the plurality of labeled groups are vertices of the directed graph and edges of the directed graph indicate a higher or lower level of the determined relative priority between connected vertices.

3. The method according to claim 2, wherein the directed graph represents the first labeled group representing clicked top-1 pages of one or more searches as having a higher priority for selection than the second labeled group of unclicked pages or a third labeled group of pages identified as spam pages.

4. The method according to claim 1, wherein:
the user behavior information is gathered from a plurality of user-provided browsing logs, and
the user behavior information includes at least one of:
click information;
sampled queries;
bookmark data;
human labeling data;
spam data; or
abandoned queries.

5. The method according to claim 1, further comprising employing the relative priorities of the plurality of labeled groups in conjunction with graph-based regularization during selection of a subset of the crawled web pages for inclusion in the index.

6. A method comprising:
under control of one or more processors configured with executable instructions,
establishing a model for regularization, the model being established, at least in part, by:
sorting a set of training web pages into a plurality of labeled groups based at least in part on user behavior information with respect to the training web pages; and
establishing one or more hierarchical relationships between the plurality of labeled groups based at least in part on a determined relative priority of each labeled group for inclusion in an index, the one or more hierarchical relationships between the plurality of labeled groups including at least one hierarchical relationship between a first labeled group of the plurality of labeled groups and a second labeled group of the plurality of labeled groups;
receiving a plurality of crawled web pages; and
applying regularization based at least in part on the model to select a subset of the crawled web pages for indexing based at least in part on:
user behavior information with respect to at least some of the crawled web pages;
features extracted from the crawled web pages; and
link relationships between the crawled web pages.

7. The method according to claim 6, wherein the features extracted from the crawled web pages include ranking features comprising at least one of a page rank, a domain rank, or a number of links pointing to a web page.

8. The method according to claim 6, wherein the features extracted from the crawled web pages include uniform resource locator (URL) features comprising at least one of: length of a URL, a number of hyphens in the URL, a number digits compared with a number of letters in a URL, or a URL depth in a web site.

9. The method according to claim 6, wherein the features extracted from the crawled web pages include click features comprising a number of clicks or visits to a web page indicated by the user behavior information.

10. The method according to claim 6, wherein:
the features extracted from the crawled web pages include a graph propagation for a first page;
the graph propagation is determined from the link relationships indicating that the first page is linked from a second page that has a high click rate over a predetermined threshold; and
the high click rate of the second page is attributed to the first page by the graph propagation.

11. The method according to claim 6, wherein the features extracted from the crawled web pages include document features comprising at least one of a page length, a topic of the page, or a number of ads in the page.

12. The method according to claim 6, wherein the features extracted from the crawled web pages include edge features comprising at least one of:
whether a link between two web pages is an inter-website link or an intra-website link; or
a number of separate links between the two web pages.

13. The method according to claim 6, wherein the regularization is graph-based regularization that is one of: similarity-based regularization or preference-based regularization.

14. The method according to claim 6, the applying regularization further comprising:
applying the features extracted from the crawled web pages and the link relationships between the crawled web pages as part of a regularization function; and applying the relative priority of the plurality of labeled groups as a loss function.

15. A computing device comprising:

a processor in communication with storage media; and a learning component maintained on the storage media and executed on the processor to:

generate a model for selecting a subset of items for indexing, the model being generated based at least in part on:

sorting a training set of items into a plurality of labeled groups based at least in part on:

user behavior information with respect to the training set of items; and link relationships between the training set of items; and establishing one or more hierarchical relationships between the plurality of labeled groups based at least in part on a determined relative priority of each labeled group for inclusion in an index, the one or more hierarchical relationships between the plurality of labeled groups including at least one hierarchical relationship between a first labeled group of the plurality of labeled groups and a second labeled group of the plurality of labeled groups.

16. The computing device according to claim 15, wherein:

the items are web pages; and the learning component is further executed to generate the model based at least in part on features extracted from the training set of web pages, the features comprising at least one of: ranking features, uniform resource locator (URL) features, click features, graph propagation features, or document features.

17. The computing device according to claim 16, further comprising a page selection component executed on the processor to apply the model to selecting the subset of web pages for indexing from a plurality of crawled web pages, the page selection component applying the model based at least in part on a graph representing the link relationships between the crawled web pages.

18. The computing device according to claim 17, wherein the page selection component is further executed on the processor to apply the model to selecting the subset of web pages for indexing from the plurality of crawled web pages based at least in part on relative priority relationships for the crawled web pages determined from the user behavior information.

19. The computing device according to claim 18, wherein the page selection component is further executed on the processor to apply the model to selecting the subset of web pages for indexing from the plurality of crawled web pages based at least in part on features extracted from the plurality of crawled web pages, the features comprising at least one of: ranking features, URL features, click features, graph propagation features, or document features.

20. The method according to claim 6, the one or more hierarchical relationships established between the plurality of labeled groups further including at least one hierarchical relationship between one of:

the first labeled group of the plurality of labeled groups and a third labeled group of the plurality of labeled groups; or the second labeled group of the plurality of labeled groups and a third labeled group of the plurality of labeled groups.

* * * * *